United States Patent [19]

Steinke

[11] Patent Number: 4,666,663
[45] Date of Patent: May 19, 1987

[54] NUCLEAR REACTOR FUEL ASSEMBLY

[75] Inventor: Alexander Steinke, Ebermannstadt, Fed. Rep. of Germany

[73] Assignee: Kraftwerk Union Aktiengesellschaft, Mulheim am Ruhr, Fed. Rep. of Germany

[21] Appl. No.: 653,934

[22] Filed: Sep. 24, 1984

[30] Foreign Application Priority Data

Sep. 27, 1983 [DE] Fed. Rep. of Germany ....... 3334974

[51] Int. Cl.4 .............................................. G21C 3/34
[52] U.S. Cl. .................................... 376/441; 376/442
[58] Field of Search ................ 376/441, 442, 438, 443

[56] References Cited

U.S. PATENT DOCUMENTS 3,753,855 8/1973 Donck .................................. 376/441
3,890,196 6/1975 Chetter ................................ 376/441
4,152,205 5/1979 Kröpfl ................................. 376/441

Primary Examiner—Donald P. Walsh
Attorney, Agent, or Firm—Herbert L. Lerner; Laurence A. Greenberg

[57] ABSTRACT

A nuclear reactor fuel assembly having a grid-shaped spacer for retaining fuel rods, the spacer includes four flat, sheet metal outer straps disposed on edge at right angles to the fuel rods defining corners of the spacer, inner sheet metal straps disposed within the outer sheet metal straps, the inner straps include two given inner straps each being transverse to one of two respective given outer straps at a corner of the spacer dividing the spacer into meshes for fuel rods including a corner mesh at a corner of the spacer and two other meshes laterally adjacent the corner mesh, a contact spring for a fuel rod disposed in the corner mesh, the contact spring having two end parts each being locked in a respective recess formed in one of the given inner straps locking the contact spring to one of the given outer straps, the recesses starting from an end edge of the one given inner strap parallel to the fuel rods, two extended arms in the corner mesh each being integral with a respective one of the end parts and each being parallel to one of the given outer straps, and other contact springs for retaining the fuel rod in the corner mesh, each of the other contact springs having an end part being integral with a respective one of the extended arms and disposed on a respective one of the given outer straps in the corner mesh.

3 Claims, 7 Drawing Figures

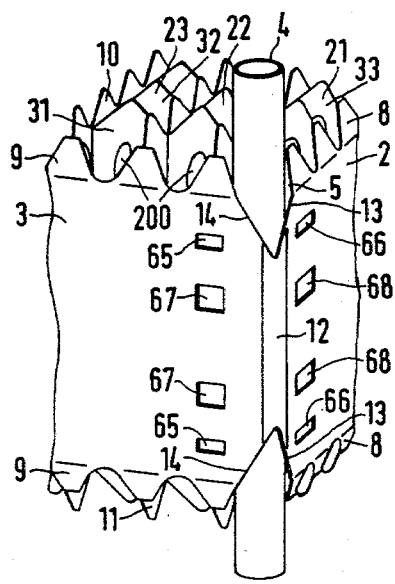
FIG 1
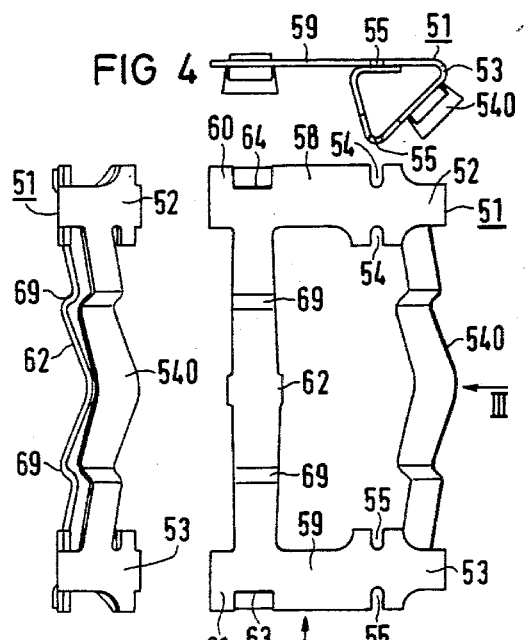
FIG 4
FIG 3
FIG 2
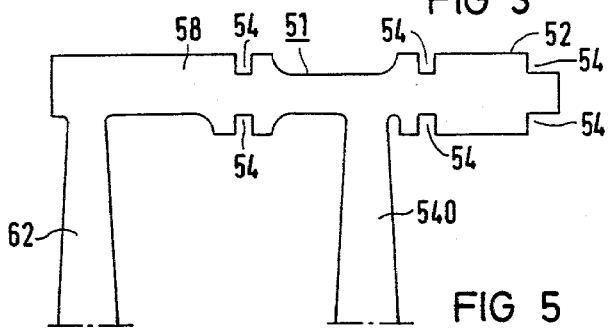
FIG 5
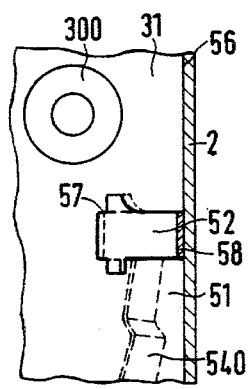
FIG 7
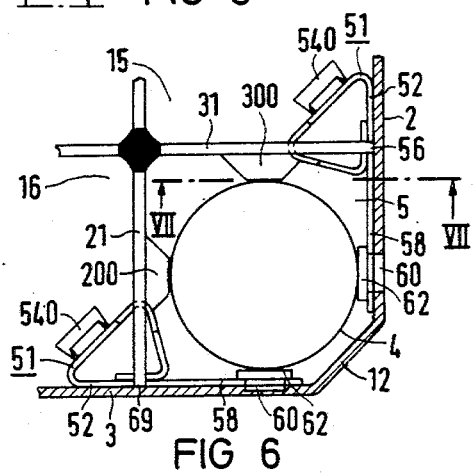
FIG 6

NUCLEAR REACTOR FUEL ASSEMBLY

The invention relates to a nuclear reactor fuel assembly with a grid-shaped spacer having a grid mesh in which mutually parallel rods, in particular, fuel rods containing nuclear fuel, are disposed, the grid mesh being formed by flat sheet metal straps which are orthogonal to the rods and are disposed on edge, the spacer having a contact spring in a corner of a grid mesh, which is provided with two end parts for a fuel rod disposed at the corner, and the contact spring having two end parts thereof engaged in respective recesses in a given sheet metal strap locked with a sheet metal strap disposed transverse to the given sheet metal strap.

Such a nuclear reactor fuel assembly is known from German Pat. DE-PS No. 29 41 320, corresponding to U.S. application Ser. No. 623,631, filed June 25, 1984, having the same inventor. The contact spring and the spacer of this prior art nuclear reactor fuel assembly can be formed of different metals so that, for instance, a highly resilient chrome-nickel steel can be chosen for the contact spring, while the sheet metal straps of the spacer can be made of a nickel-iron or a zirconium alloy which only absorbs neutrons to a small degree. The spacer is furthermore easy to assemble and, nevertheless, the parts of the contact spring are prevented from falling out of the spacer if they are broken.

As a rule, such a nuclear reactor fuel assembly has a head part and a base part. These parts are connected to each other by control rod guide tubes. Each of the control rod guide tubes is detachably fastened with one end thereof to a head plate of the head part and with the other end thereof to a base plate of the base part, such as by means of a screw connection. The control rod guide tubes penetrate the head and base plate at right angles. The head and base plate are rectangular and usually square.

The control rod guide tubes welded to the grid-shaped spacers are guided in a square grid mesh through several rectangular and normally square grid-shaped spacers which as a rule are disposed at the same distance from each other, as seen in the direction of the longitudinal axis of the control rod guide tubes and therefore also of the fuel assembly. The spacers are aligned with each other and with the head and base plate. Fuel rods which contain nuclear fuel in hermetically-sealed cladding tubes are guided by the square grid meshes of the spacer which are not occupied by the control rod guide tubes. These fuel rods are fastened neither to the head plate of the head part nor to the base plate of the base part, but rather have play in the longitudinal direction between the head and the base plate and therefore can freely expand in the direction of the longitudinal axis, i.e. in the longitudinal direction of the nuclear reactor fuel assembly.

In the reactor core, especially in a pressurized-water nuclear reactor, a number of such identical nuclear reactor fuel assemblies are disposed closely together in a chessboard pattern with parallel longitudinal axes. During loading and unloading of the nuclear reactor with the individual nuclear reactor fuel assemblies, adjacent nuclear reactor fuel assemblies can become hooked or entangled in the reactor core at the four outer sheet metal straps of the spacers, which leads to the destruction of these outer sheet metal straps and prevents reinsertion of the nuclear reactor fuel assemblies into the reactor core.

In particular, those nuclear reactor fuel assemblies which have assumed a heavy curvature due to operational stresses in the reactor core, have a tendency to become entangled. Therefore, the two edges of the outer sheet metal straps of the spacers which are orthogonal to the rods, i.e. to the control rod guide tubes and to the fuel rods of the nuclear reactor fuel assembly, have already been provided with slightly inwardly inclined rejection or deflection tabs. The edges of the spacers which are orthogonal to the rods of the nuclear reactor fuel assembly, can slide off the table when loading and unloading the nuclear reactor with laterally adjacent nuclear reactor fuel elements moving relative to each other in the lengthwise direction, so that entanglement at these edges is avoided.

However, such inward-inclined rejection tabs cannot be provided at the corners of a spacer of the nuclear reactor fuel assembly in which fuel rods in the form of corner rods of the nuclear reactor fuel assembly are located in respective square grid meshes between two orthogonal outer sheet-metal straps. This is because at the corners, the tabs worsen the thermo-hydraulic conditions for the coolant in the nuclear reactor, to such a degree that these fuel rods, representing the corner rods, are not cooled sufficiently and can therefore suffer damage. A danger therefore exists of the nuclear reactor fuel assemblies diagonally adjacent in a chess-board pattern in the reactor core, becoming entangled with the corners of their spacers during loading and unloading of the nuclear reactor. This entanglement can be prevented, as long as possible, at least to a very large degree, by rejection chamfers or deflection stops at these corners. If, however, a contact spring is also disposed in the grid meshes in the corners of the spacer and is locked with its two end parts in a recess at an outer sheet-metal strap, then the height of the spacers, i.e., the width of its sheet metal straps, must be particularly large if long rejection chamfers are to be formed at the corners of the spacer.

It is accordingly an object of the invention to provide a nuclear reactor fuel assembly which overcomes the hereinafore-mentioned disadvantages of the heretofore-known devices of this general type, with a spacer which has a locked contact spring even in a grid mesh in a corner of the spacer, and which can nevertheless have particularly long deflection inclinations at this corner as well as an ordinary and non-enlarged, but optimally small, overall height.

With the foregoing and other objects in view there is provided, in accordance with the invention, a nuclear reactor fuel assembly having a grid-shaped spacer for retaining rods, especially fuel rods containing nuclear fuel, the spacer comprising four flat, sheet metal outer straps disposed on edge at right angles to the fuel rods defining corners of the spacer, inner sheet metal straps disposed within the outer sheet metal straps, the inner straps including two given inner straps each being transverse to one of two respective given outer straps at a corner of the spacer dividing the spacer into meshes for fuel rods including a corner mesh at a corner of the spacer and two other meshes laterally adjacent the corner mesh, a contact spring for a fuel rod disposed in the corner mesh, the contact spring having two end parts each being locked in a respective recess formed in one of the given inner straps locking the contact spring to one of the given outer straps, the recesses starting from an end edge of the one given inner strap parallel to the fuel rods, two extended arms in the corner mesh each being integral with a respective one of the end parts and each being parallel to one of the given outer straps, and other contact springs for retaining the fuel rod in the corner mesh, each of the other contact springs having an end part being integral with a respective one of the extended arms and disposed on a respective one of the given outer straps in the corner mesh.

In accordance with another feature of the invention, the end parts of the other contact springs are engaged in support recesses formed in the outer straps in the corner mesh. This permits the interception of forces which act in the longitudinal direction of the rod disposed in this grid mesh. The forces act on the contact spring contained in this grid mesh, and start from the rod.

In accordance with a concomittant feature of the invention, the outer straps have bypass recesses formed therein in the corner mesh for receiving portions of the first-mentioned contact springs. This assures that the contact spring can travel the full spring distance when the fuel rod is inserted into the grid mesh.

Other features which are considered as characteristic for the invention are set forth in the appended claims.

Although the invention is illustrated and described herein as embodied in a nuclear reactor fuel assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a fragmentary, diagrammatic, perspective view of a corner of the spacer of a nuclear reactor fuel assembly according to the invention;

FIG. 2 is a side-elevational view of a contact spring in the spacer according to FIG. 1;

FIG. 3 is a front-elevational view of the contact spring, as seen in the direction of the arrow III in FIG. 2;

FIG. 4 is a bottom-plan view of the contact spring, as seen in the direction of the arrow IV in FIG. 2;

FIG. 5 is a side-elevational view of one-half of a stamped part for forming the contact spring according to FIGS. 2 to 4;

FIG. 6 is a partially cross-sectional top-plan view of a grid mesh of the corner of the spacer shown in FIG. 1; and FIG. 7 is a longitudinal-sectional view taken through the grid mesh along the line VII—VII according to FIG. 6, in the direction of the arrows.

Referring now to the figures of the drawings as a whole, there is seen a portion of a square, grid-shaped spacer of a nuclear reactor fuel assembly according to the invention, formed of a nickel-iron alloy. The spacer has two flat, planar outer sheet metal straps 2 and 3 which are disposed on edge and are orthogonal to each other. Disposed on the inside of these outer sheet metal straps 2 and 3 are inner sheet metal straps 21 to 23 parallel to the outer sheet metal strap 2, and inner sheet metal straps 31 to 33 parallel to the outer sheet metal strap 3. The straps 21 to 23 and 31 to 33 are also disposed on edge and penetrate each other at right angles, forming square grid meshes. Such square grid meshes always contain a control rod guide tube or a fuel rod of the nuclear reactor fuel assembly containing nuclear fuel, disposed at right angles to the inner and outer sheet metal straps. For the purpose of greater clarity, only a single fuel rod 4 is shown in the outermost square grid mesh 5 which is formed by the outer sheet metal straps 2 and 3, in the corner of the spacers. The lateral surfaces of the inner and outer sheet metal straps are parallel to the longitudinal direction of the spacers. The inner sheet metal straps 21 to 23 and 31 to 33 have respective fixed bumps 200 and 300 within the square grid meshes intended for fuel rods. A contact spring formed of chrome-nickel steel is furthermore disposed in one corner of each such grid mesh, for the fuel rod contained in the grid mesh. This contact spring has two end parts locked in respective recesses in a given sheet metal strap, with which the contact spring is locked to another sheet metal strap disposed transverse to the given strap. A leaf spring is formed at the other strap, transverse to the sheet metal straps 2 and 3 or 21 to 23 and 31 to 33, respectively, or parallel to the rods. The springs will be fully discussed below. The control rod guide tubes brought through the individual grid meshes of the grid-shaped spacer are welded to the spacers, while bumps and contact springs in other grid meshes provide force-locking support in other grid meshes of the grid-shaped spacers. A force-locking connection is one in which an element forcibly locks the two parts together. At the edges which are orthogonal to the mutually parallel control rod guide tubes and to the fuel rod in the spacer, the outer sheet metal straps 2 and 3 have slightly inward-inclined deflector or bumper tabs 8 and 9. The edges of the inner sheet metal straps 21 to 23 and 31 to 33 which are orthogonal to the control rod guide tubes and fuel rods, are provided with turbulence tabs 10, 11 for causing turbulence in the cooling water flowing through the nuclear reactor fuel assembly in the nuclear reactor.

The outer sheet metal straps 2 and 3 are connected to each other by an intermediate strip 12 which is located at the outer edge of the spacer. The strip 12 is parallel to the mutually parallel control rod guide tubes and fuel rods in the grid meshes; it is inclined relative to the two outer sheet metal straps 2 and 3; and it is parallel to these control rod guide tubes and fuel rods. The two outer sheet metal straps 2 and 3 are chamfered at the corners of the spacer toward the intermediate strip 12, starting from the edges which are orthogonal to the control rod guide tubes and the fuel rods contained in the spacer, forming straight chamfered edges 13 and 14 with the same inclination.

A contact spring 51 formed of chrome-nickel steel is disposed in the grid meshes 15 and 16 of the spacer according to FIG. 6 for a rod formed of a fuel rod which is contained in the respective grid mesh 15 or 16. The spring is always disposed in a corner which is laterally adjacent the grid mesh 5. The contact spring 51 has an upper end part 52 and a lower end part 53, at which a leaf spring 540 is formed which is parallel to the rod of the respective grid mesh 15 or 16 and is curved into the grid mesh 15 or 16. The upper and lower end parts 52 and 53 are constructed with a mirror symmetry, are bent out of a stamped part formed of chrome-nickel steel according to FIG. 5, and are provided with notches 54 and 55 lying along a straight line in the spacer parallel to the rods, in the upper end part 52 and the lower end part 53.

As seen in FIGS. 6 and 7, the inner sheet metal strap 31 located between the grid mesh 15 and the grid mesh 5 in the corner of the spacer has two recesses at its end edge 56 parallel to the rods, which start from the end edge 56, and are spaced from each other. One of the recesses 57 which is closer to the upper edge of the strap 31, can be seen in FIG. 7. The two end parts 52 and 53 of the contact spring 51 with the notches 54 and 55 are inserted into these recesses in the end edge 56 parallel to the rods. The end parts 52, 53 are locked by the outer sheet-metal strap 2 which is transverse to the inner sheet metal strap 31. The outer sheet metal strap 2 is welded parallel to the rods at the end edges of the inner sheet metal strap 31 and the other inner sheet metal straps parallel thereto.

Extender arms 58 and 59 are formed at both end parts 52 and 53 of the contact spring 51. The extender arm 58 and 59 extend through the recesses (for instance the recess 57) at the end edge of the inner sheet-metal strap 31 parallel to the rods, into the grid mesh 5 in the corner of the spacer. These extender arms 58 and 59 are disposed at right angles to the rods in the spacer. Each of the two extender arms 58 and 59 form an end part 60 and 61 for a further contact spring in the corner of the spacer at the inside of the outer sheet-metal strap 2 in the grid mesh 5. The further contact spring has a leaf spring 62 which is parallel to the rods in the spacer. The rod 4 contained in the grid mesh 5 rests against the leaf spring 62.

The contact spring 51 which is disposed in the corner of the grid mesh 16 laterally adjacent the grid mesh 5 is constructed exactly like the contact spring disposed in the grid mesh 15 and is locked in the same way in corresponding recesses at the end surface 89 of the inner sheet metal strap 21, parallel to the rods, by the outer sheet metal strap 3. This contact spring 51 also engages with its extender arms 58 and 59 into the grid mesh 5 where it forms a contact spring with end parts 60 and 61 and a leaf spring 62, at the inside of the outer sheet metal strap 3.

As seen in FIG. 2, bosses 63, 64 are formed at the end parts 60 and 61 of the contact springs with the leaf springs 62 in the grid mesh 5. The bosses 63 and 64 each engage a respective support recess 65 and 66 in the outer sheet metal straps 3 or 2 as seen in FIG. 1, and intercept forces acting on the extender arms 58 and 59 in the longitudinal direction of the rod 4.

Bypass recesses 67 and 68 for bends 69 are also formed in the outer sheet metal straps 3 and 2. The bends 69 are formed in the leaf springs 62 of the contact springs in grid mesh 5, and are curved into the grid mesh 5.

The foregoing is a description corresponding in substance to German Application No. P 33 34 974.6, dated Sept. 27, 1983, the International Priority of which is being claimed for the instant application, and which is hereby made part of this application. Any material discrepancies between the foregoing specification and the aforementioned corresponding German application are to be resolved in favor of the latter.

I claim:

1. Nuclear reactor fuel assembly having a grid-shaped spacer for retaining fuel rods, the spacer comprising four flat, sheet metal outer straps disposed on edge at right angles to the fuel rods defining corners of the spacer, inner sheet metal straps disposed within said outer sheet metal straps, said inner straps including two given inner straps each being transverse to one of two respective given outer straps at a corner of the spacer dividing the spacer into meshes for fuel rods including a corner mesh at a corner of the spacer and two other meshes laterally adjacent said corner mesh, a contact spring for a fuel rod disposed in said corner mesh, said contact spring having two end parts each being locked in a respective recess formed in one of said given inner straps locking said contact spring to one of said given outer straps, said recesses starting from an end edge of said one given inner strap parallel to the fuel rods, two extended arms in said corner mesh each being integral with a respective one of said end parts and each being parallel to one of said given outer straps, and other contact springs for retaining the fuel rod in said corner mesh, each of said other contact springs having an end part being integral with a respective one of said extended arms and disposed on a respective one of said given outer straps in said corner mesh.

2. Nuclear reactor fuel assembly according to claim 1, wherein said end parts of said other contact springs are engaged in support recesses formed in said outer straps in said corner mesh.

3. Nuclear reactor fuel assembly according to claim 1, wherein said outer straps have bypass recesses formed therein in said corner mesh for receiving portions of said first-mentioned contact springs.

* * * * *